(12) United States Patent
Bataller et al.

(10) Patent No.: US 10,007,849 B2
(45) Date of Patent: Jun. 26, 2018

(54) PREDICTING EXTERNAL EVENTS FROM DIGITAL VIDEO CONTENT

(71) Applicant: Accenture Global Solutions Limited, Dublin (IE)

(72) Inventors: Cyrille Bataller, Mougins (FR); Anders Astrom, Villa Marina (SG)

(73) Assignee: Accenture Global Solutions Limited, Dublin (IE)

( * ) Notice: Subject to any disclaimer, the term of this patent is extended or adjusted under 35 U.S.C. 154(b) by 78 days.

(21) Appl. No.: 15/167,701

(22) Filed: May 27, 2016

(65) Prior Publication Data
US 2016/0350597 A1 Dec. 1, 2016

Related U.S. Application Data

(60) Provisional application No. 62/167,930, filed on May 29, 2015.

(51) Int. Cl.
*G06K 9/00* (2006.01)
*G06F 17/30* (2006.01)
(Continued)

(52) U.S. Cl.
CPC ..... *G06K 9/00765* (2013.01); *G06F 17/3028* (2013.01); *G06K 9/00255* (2013.01);
(Continued)

(58) Field of Classification Search
USPC ....... 382/100, 103, 106–107, 155, 162, 168, 382/173, 181, 190, 209, 224, 232, 238,
(Continued)

(56) References Cited

U.S. PATENT DOCUMENTS 5,541,590 A 7/1996 Nishio
7,418,431 B1 * 8/2008 Nies ............ G06Q 10/06
702/2

(Continued)

FOREIGN PATENT DOCUMENTS

| EP | 2131328 | 12/2009 |
| WO | WO 2003/067884 | 8/2003 |
| WO | WO 2007/062044 | 5/2007 |

OTHER PUBLICATIONS

Singapore Search Report for Application No. 10201604368T, dated Nov. 11, 2016, 5 pages.
(Continued)

*Primary Examiner* — Sayed Azarian
(74) *Attorney, Agent, or Firm* — Fish & Richardson P.C.

(57) ABSTRACT

Computerized methods and systems, including computer programs encoded on a computer storage medium, may detect event shown within digital video content captured by one or more video cameras, and correlate these detected events to real-world conditions that may not be captured within the digital video data. For example, a computing system may detect events shown within digital video content captured by one or more video cameras, and may obtain data that identifies at least one external event. The computer system may establish a predictive model that correlates values of event parameters that characterize the detected and external events during a first time period, and may apply the predictive model to an event parameter that characterizes an additional event detected during a second time period. Based on an outcome of the predictive model, the computing system may determine an expected value of the external event parameter during the second time period.

16 Claims, 6 Drawing Sheets

(51) Int. Cl.
| | |
|---|---|
| *H04N 7/18* | (2006.01) |
| *G06T 15/20* | (2011.01) |
| *G06T 19/00* | (2011.01) |
| *G06K 9/62* | (2006.01) |
| *G06T 7/00* | (2017.01) |
| *G06T 7/80* | (2017.01) |
| *G06T 7/73* | (2017.01) |
| *G06T 7/13* | (2017.01) |
| *G06T 7/292* | (2017.01) |
| *G08B 13/196* | (2006.01) |

(52) U.S. Cl.
CPC ..... *G06K 9/00295* (2013.01); *G06K 9/00718* (2013.01); *G06K 9/00744* (2013.01); *G06K 9/00771* (2013.01); *G06K 9/00778* (2013.01); *G06K 9/6202* (2013.01); *G06K 9/6263* (2013.01); *G06T 7/0002* (2013.01); *G06T 7/13* (2017.01); *G06T 7/292* (2017.01); *G06T 7/75* (2017.01); *G06T 7/80* (2017.01); *G06T 15/205* (2013.01); *G06T 19/006* (2013.01); *H04N 7/18* (2013.01); *H04N 7/181* (2013.01); *G06K 2009/00738* (2013.01); *G06T 2207/10016* (2013.01); *G06T 2207/20061* (2013.01); *G06T 2207/30168* (2013.01); *G06T 2207/30201* (2013.01); *G06T 2207/30232* (2013.01); *G06T 2207/30242* (2013.01); *G08B 13/19602* (2013.01); *G08B 13/19608* (2013.01)

(58) Field of Classification Search
USPC ....... 382/254, 274, 276, 286–295, 305, 312, 382/297; 707/706; 600/301; 702/2; 705/3; 340/540
See application file for complete search history.

(56) References Cited

U.S. PATENT DOCUMENTS

| | | |
|---|---|---|
| 2007/0136102 A1* | 6/2007 | Rodgers ................ A61B 5/1113 705/3 |
| 2008/0201116 A1 | 8/2008 | Ozdemir et al. |
| 2010/0207762 A1 | 8/2010 | Lee et al. |
| 2010/0299116 A1 | 11/2010 | Tomastik et al. |
| 2011/0050864 A1 | 3/2011 | Bond |
| 2011/0228092 A1 | 9/2011 | Park |
| 2012/0044247 A1 | 2/2012 | Naimark |
| 2012/0256745 A1* | 10/2012 | Piett ....................... G06Q 30/02 340/540 |
| 2013/0027561 A1 | 1/2013 | Lee et al. |
| 2013/0054552 A1* | 2/2013 | Hawkins ............... G06N 99/005 707/706 |
| 2013/0169749 A1 | 7/2013 | Zhou et al. |
| 2014/0155705 A1* | 6/2014 | Papadopoulos ...... A61B 5/0022 600/301 |
| 2015/0025329 A1* | 1/2015 | Amarasingham ... G06F 19/3456 600/301 |
| 2016/0034813 A1 | 2/2016 | Hsu et al. |

OTHER PUBLICATIONS

Australian Office Action for Application No. 2016203571, dated Sep. 2, 2016, 4 pages.
European Extended Search Report for Application No. 16171901.8, dated Oct. 18, 2016, 10 pages.
Australian Office Action for Application No. 2016203571, dated Jan. 10, 2017, 2 pages.
Canadian Office Action for Application No. 2,931,743, dated Feb. 16, 2017, 4 pages.
Australian Office Action in Application No. 2016203579, dated Jun. 22, 2016, 5 pages.

* cited by examiner

PREDICTING EXTERNAL EVENTS FROM DIGITAL VIDEO CONTENT

CROSS-REFERENCE TO RELATED APPLICATION

This application claims the benefit under 35 U.S.C. § 119(e) of U.S. Provisional Application No. 62/167,930, filed May 29, 2015, and titled "Video Analytics of Video Information," which is hereby incorporated by reference in its entirety.

TECHNICAL FIELD

This specification describes technologies related to video processing.

BACKGROUND

Modern organizations have widely adopted network-based video surveillance technologies, due in part to the decreasing cost of network components and increasing concerns regarding terrorism and crime. The rapid adoption of these technologies has resulted in a substantial rise in an amount of captured video content that is available for these organizations to monitor. Real-time monitoring of the large amounts of captured video content, however, is often unmanageable for many organizations. Therefore, some organizations have forgone real-time video content monitoring in favor of post hoc analysis of video content for particular events, e.g., for forensic and evidentiary purposes.

SUMMARY

This specification generally describes computerized systems, processes, devices, and other techniques for detecting events shown within digital video content captured by one or more video cameras, and for correlating these detected events to external events that may not be captured within the digital video data. In this specification, an event corresponds to a presence or movement of a particular object, individual, or groups of objects or individuals within portions of the digital video content captured by the one or more video cameras, and an external event corresponds to an observable condition or event quantified objectively through corresponding event parameters.

For example, a computer system may analyze digital video content captured by one or more video cameras, and may apply video analytics to portions of the stored digital video content to detect events shown within the digital video data at corresponding detection times. In other instances, the computing system may receive streaming video content from the one or more video cameras, and may apply the video analytics to portions of the streaming digital video content to detect events shown within the streaming digital video content at corresponding detection times, e.g., prior to or without storing the streaming digital video content. These detected events may, for example, be associated with values of event parameters, e.g., event parameter values, which may characterize each of the detected events at the corresponding detection times, and which may be determined through the applied video analytics. The computer system may obtain values of event parameters, e.g., event parameter values, that characterize an external event during a particular time period, and through an application of one or more machine learning algorithms, correlate certain ones of the detected and external event parameter values to generate a model that predicts expected values of the event parameters that characterize the external events, e.g., external event parameters, during the particular time period and other time periods.

The computer system may also detect an additional event shown within the digital video data at a corresponding detection time, and may apply the predictive model to event parameter values that characterize the detected additional event to define an expected value of one or more of the external event parameters at the corresponding detection time. The expected value of the external event parameters, which may be not be detectable within the digital video content, may be provided to one or more communications devices for presentation within corresponding interfaces, such as graphical user interfaces (GUIs) and voice-user interfaces (VUIs)

In other implementations, the computer system applies the predictive model to event parameter values characterizing events detected within captured digital video content at various times during a first time period, and based on an outcome of the predictive model, and predicts one or more expected occurrences of the events at various times during a second time period. The computer system may also detect an occurrence of an additional events within the captured digital video content, may perform operations that determine whether the additional occurrence represent a deviation from the expected occurrences. When the additional occurrence represents a deviation from the expected occurrence, i.e., the additional occurrence represents an anomaly, the computing system may transmit data identifying the anomaly to one or more communications devices for presentation within corresponding interfaces, such as graphical user interfaces (GUIs) and voice-user interfaces (VUIs).

In one implementation, a system may include one or more computers and one or more storage devices storing instructions that are operable, when executed by the one or more computers, to cause the one or more computers to perform operations comprising detecting events shown within digital video content captured by one or more video cameras, and obtaining first data that identifies at least one external event. The detected events may be associated with corresponding event parameters and detection times within a first time period, and the obtained data may include observed values of an external event parameter that characterize the external event during the first time period. In some aspects, the first data is not derived from the digital video content. The one or more computers further perform the operations of establishing a predictive model that correlates the values of the external event parameters to values of the event parameters that characterize a portion of the detected events during the first time period, and detecting an additional event shown within the digital video content. The additional event may be associated with a corresponding additional event parameter and a second detection time. In response to the detection of the additional event, the one or more computers further perform the operations applying the predictive model to a value of the additional event parameter, and determining an expected value of the external event parameter at the second detection time, based on an outcome of applying the predictive model to the value of the additional event parameter. The one or more computers further perform the operation of transmitting data identifying the expected value of external event parameter to a communications device. The communications device may be configured to present a representation of the expected value of the external event parameter to a user through a corresponding interface.

In some aspects, the one or more computers may further perform the operation of receiving a portion of the video content from the one or more video cameras, and the one or more video cameras may include at least one of a pan-zoom-tilt video camera or a camera having a fixed field-of-view. Further, in additional aspects, the step of detecting the additional event may include receiving an additional video content from the one or more video cameras, and detecting the additional event within the additional video content captured by the one or more video cameras.

Additionally, the one or more computers may further perform the operation of applying one or more video analytics to portions of the digital video content. The applied video analytics may, for example, include at least one of an image acquisition process, an object detection process, an object classification process, an object recognition process, an event detection process, or an object tracking process. In some aspects, the step of detecting the event may include, based on an outcome of applying the video analytics to the portions of the digital video content, detecting at least one of the events and establishing the value of at least one of the event parameters, and the step of detecting the additional event may include, based on an outcome of applying the video analytics to the portions of the digital video content, detecting the additional event and establishing the value of the additional event parameter. In further aspects, the at least one external event is not shown within the digital video content captured by the one or more cameras.

In certain aspects, the step of establishing the predictive model may include applying a machine learning algorithm to data identifying the values of the external event parameters and the values of the event parameters that characterize the portion of the detected events during the first time period, and establishing a correlation between the values of the external event parameters and the event parameters, based on an outcome of the machine learning algorithm. The one or more computers may further perform the operations of obtaining second data specifying an observed value of the external event parameter at the second detection time, determining an existence of a variance between the actual and expected values of the external event parameters, and modifying the predictive model in accordance with the determined variance.

The one or more computers may further perform the operations of establishing a plurality of predictive models that correlate the values of the external event parameters to values of corresponding ones of the event parameters, applying each of the predictive models to the value of the additional event parameter, determining a plurality of expected values of the external event parameter at the second detection time, based on an outcome of corresponding ones of the predictive models, obtaining second data specifying an observed value of the external event parameter at the second detection time, determining variances between the observed value and corresponding ones of the expected values, and selecting one or more of the event parameters as predictors of the observed value of the external event parameter based on the determined variances.

In other instances, the external event may include at least one of a number of customer inquiries or orders, a total number of individuals within a restricted area, or a total number of vehicles disposed within a restricted area, and detected events may include at least one of queued individuals, individuals entering a restricted area through a corresponding entrance, or vehicles entering the restricted area through a corresponding entrance, and the event parameters may include at least one of a number of the queued individuals, a number of the individuals that enter the restricted area through the corresponding entrance, or a number of the vehicles that enter the restricted area through the corresponding entrance. Furthermore, and in response to the transmitted data, the communications device is further configured to allocate one or more resources in accordance with the expected value of the expected event parameter.

In additional aspects, the one or more computer may further perform the operations of establishing an existence of a time-varying pattern among the event parameters of the events detected during the first time period, and based on the time-varying pattern, generating data identifying expected occurrences of one or more of the events during a second time period that includes the second detection time, the second time period occurring after the first time period. Further, in some aspects, the step of establishing the existence of the time-varying pattern may include applying at least one of a machine learning algorithm or a data mining algorithm to data identifying the detected events and the values of the event parameters, and establishing the existence of the time-varying pattern based on an outcome of the at least one machine learning algorithm or data mining algorithm.

In other aspects, the one or more computers may further perform the operations of determining that the additional event represents a deviation from the expected occurrences during the second time period and in response to the determination, transmitting data identifying the deviation to a communications device. The communications device may be configured to present, to the user within a corresponding interface, a notification that includes at least a portion of the transmitted data. Further, in some aspects, the detected additional event may correspond to at least one of a detected presence of an unexpected object within a portion of the digital video content, a detected removal of an expected object within a portion of the digital video content, or a detection of smoke or flames within a portion of the digital video content.

In other implementations, a system may include one or more computers and one or more storage devices storing instructions that are operable, when executed by the one or more computers, to cause the one or more computers to perform operations that include detecting events shown within digital video content captured by one or more video cameras, and applying a predictive model to values of the event parameters that characterize a portion of the detected events during the first time period. The detected events may, for example, be associated with corresponding event parameters and detection times within a first time period, and based on an outcome of applying the predictive model to the values of the event parameters, the one or more computers may further perform the operation of generating data that identifies expected occurrences of one or more of the events during a second time period, the second time period occurring after the first time period. The one or more computers may further perform the operations of detecting an additional event within the captured video content, the additional event being associated with a second detection time that occurs within the second time period, and determining that the additional event represents a deviation from the expected occurrences during the second time period. In response to the determination, the one or more computers may further perform the operation of transmitting data that identifies the deviation to a communications device. The communications device may be configured to present, to the user within a corresponding interface, a notification that includes a representation of the deviation.

In some aspects, the step of generating may include, based on the outcome of the predictive model, establishing an existence of a time-varying pattern among the values of the event parameters of the events detected during the first time period, and generating the expected occurrences of one or more of the events during the second time period in accordance with the time-varying pattern. The step of establishing the existence of the time-varying pattern may include applying at least one of a machine learning algorithm or a data mining algorithm to data identifying the values of the event parameters and the detected events, and establishing the existence of the time-varying pattern based on an outcome of the at least one machine learning algorithm or data mining algorithm. In other aspects, the detected additional event may correspond to at least one of a detected presence of an unexpected object within a portion of the digital video content, a detected removal of an expected object within a portion of the digital video content, or a detection of smoke or flames within a portion of the digital video content.

In other implementations, corresponding computer-implemented methods and computer programs may be configured to perform those steps performed by the example apparatus described above. One or more computer programs can be so configured by virtue of having instructions that, when executed by device, cause the device to perform the actions.

Some implementations of the techniques described herein can, in certain instances, realize one or more of the following advantages. First, a video monitoring system that has limited coverage of a monitored area may be leveraged to predict the occurrence of external events outside the field of view of one or more cameras in the monitoring system. For example, it may be cost prohibitive or otherwise infeasible to install a sufficient number of video cameras in a surveillance system to achieve simultaneous coverage of every location within a large surveilled venue (e.g., a stadium, a parking lot). Despite coverage gaps from a limited set of cameras, the systems and techniques herein may nonetheless predict external events based on detected events that are actually shown in available video content. The predictive capabilities may thus at least somewhat make up for coverage deficiencies that may be present in a smaller and more cost effective video surveillance system. Additionally, these capabilities may facilitate the ability for organizations to rely on more compact surveillance systems that generate less video content, thereby reducing the amount of video content that requires processing, reducing network bandwidth expended in transmitting video content to a management system, and reducing the storage requirements for recorded video content.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a computing system that detects events shown within digital video content captured by one or more video cameras, and correlates these detected events to external events that may not be shown within the digital video content. In this specification, an event may correspond to a presence or movement of a particular object, individual, or groups of objects or individuals within portions of the digital video content captured by the one or more video cameras, and examples of detected events include, but are not limited to, a presence within the captured digital video content of queued individuals, individuals or vehicles entering a restricted area through corresponding entrances, and a presence of objects, such as luggage, within a restricted area. Further, in some instances, an external event may represent an observable condition or event quantified objectively through corresponding event parameter values, and examples of external events include, but are not limited to, a number of attendees of a particular event, a number of customers served by a business entity during a particular time period, and a number of vehicles disposed within a particular parking lot, e.g., an airport parking lot.

The computing system may, in some aspects, store the digital video content captured by the one or more video cameras, and apply video analytics to portions of the stored digital video content to detect events shown within the digital video data at corresponding detection times. These detected events may be associated with values of event parameters, e.g., event parameter values, which characterize each of the detected events at corresponding detection times during a first time period. The system may obtain values of external event parameters that characterize an external event during the first time period, and through an application of one or more machine learning algorithms, may correlate certain ones of the detected and external event parameters to generate a model that predicts the expected values of the external event parameters during a second, subsequent time period.

The computing system may also detect an additional event shown within the digital video data at a corresponding detection time, and may apply the predictive model to a value of an event parameter that characterizes the additional detected event to define an expected value of one or more of the external event parameters. In some aspects, the computing system may provide the expected value, which may be not be detectable within the digital video content, to one or more communications devices for presentation within corresponding interfaces, such as graphical user interfaces (GUIs) and voice-user interfaces (VUIs)

Figure 1:
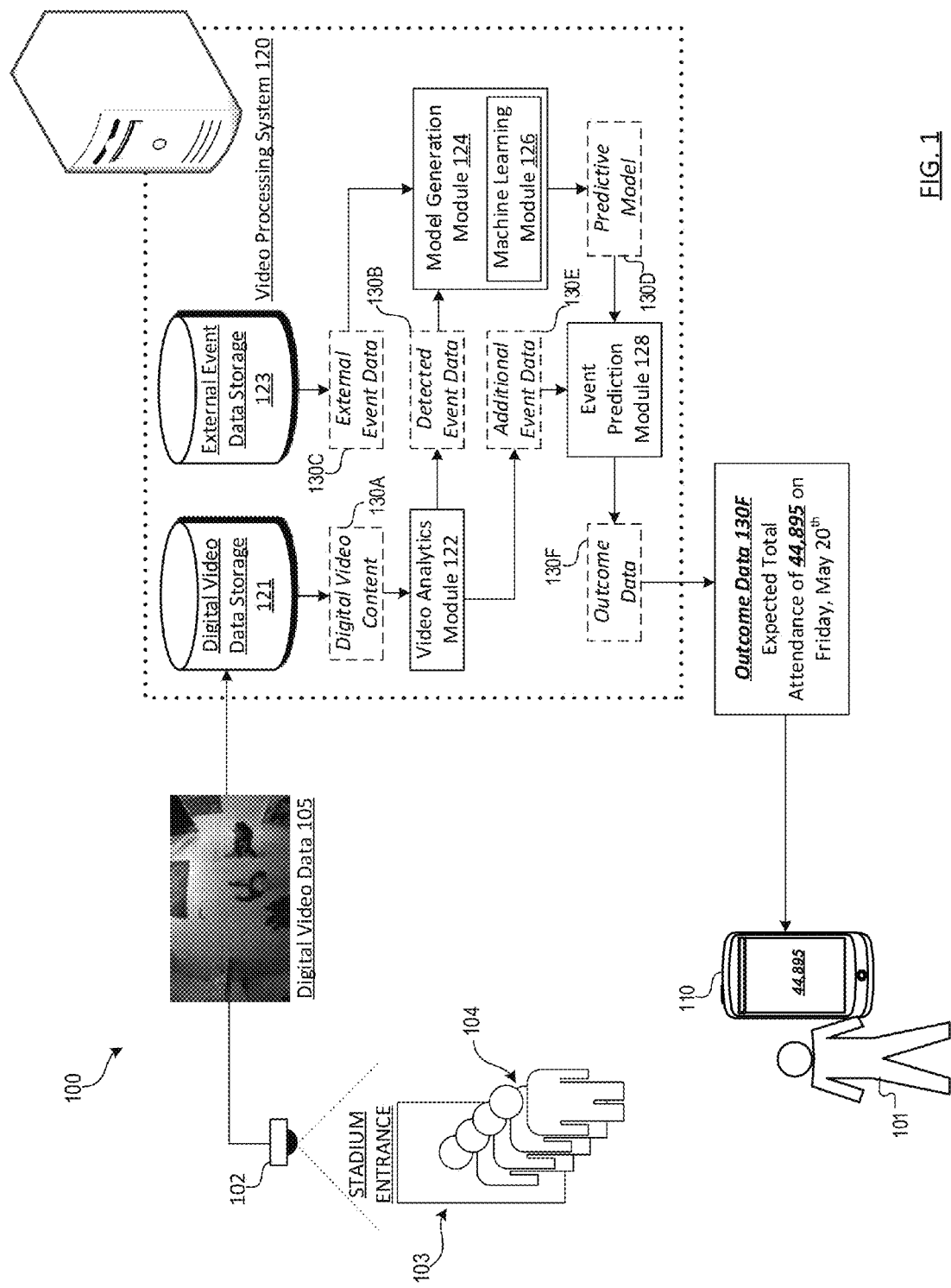
FIG. 1 is a diagram of an environment in which a video processing system correlates external events with events detected within captured video content.

FIG. 1 illustrates an example system 100 that correlates events detected within digital video content to external events not shown within the digital video content. In some aspects, system 100, includes one or more video cameras, e.g., a video camera 102, a client device 110, and a video processing system 120, which may be interconnected through any appropriate combination of communications networks, e.g., a wireless local area network (LAN), e.g., a "WiFi" network, a RF network, a Near Field Communication (NFC) network, a wireless Metropolitan Area Network (MAN) connecting multiple wireless LANs, and a wide area network (WAN), e.g., the Internet.

In one implementation, video camera 102 may be configured to capture digital video content indicative of a presence or movement of a particular object, individual, or groups of objects or individuals at a geographic location. For example, as illustrated in FIG. 1, video camera 102 may be positioned proximate to an entrance 103 of a stadium, and may be configured to capture a presence and/or movement of one or more customers 104 queued at stadium entrance 103 and awaiting entry into the stadium. Video camera 102 may, for example, represent a video camera having a fixed field-of-view, which may be targeted to entrance 103 upon installation, a video camera having variable fields-of-view, as a configurable pan-zoom-tilt (PZT) camera, and additionally or alternatively, a movable video camera, such as dashboard video cameras, body-worn and wearable video cameras, and cameras incorporated within or attached to drones and other manned or unmanned vehicles. In some aspects, the one or more video cameras may be configured to transmit packetized data that includes portions of the captured video content to video processing system 120 across any of the networks described above. The transmitted packetized data may also include data, e.g., global positioning system (GPS) data, that identifies a current location and/or one or more prior locations of the one or more video cameras.

For example, video camera 102 may generate digital video content that captures the presence and/or movement of queued customers 104, and may transmit data including portions of the captured digital video content, e.g., digital video data 105, to video processing system 120 across an appropriate one of the communications networks. Video camera 102 may transmit portions of digital video data 105 to video processing system 120 at regular, predetermined intervals or in response to a detection of one or more triggering events, such when an amount of stored digital video content that exceeds a predetermined threshold. Additionally, in some instances, video camera 102 may append data or metadata to digital video data 105 that identifies video camera 102, a time stamp associated with the transmitted portion of the digital video content, and/or a location of video camera 102.

In additional instances, video camera 102 may represent a component of a surveillance system established and maintained by a business entity associated with the stadium, and the surveillance system may include a plurality of video cameras, including video camera 102, disposed at various locations within and outside of the stadium. The surveillance system may, for example, include a video management system (not depicted in FIG. 1) configured to receive, store, and process portions of the digital video content captured by video camera 102 and one or more of the other video cameras of the surveillance system. For example, the video management system may receive the digital video content captured by video camera 102 and one or more of the other video cameras, and may transmit portions of the captured digital video content to video processing system 120, along with data or metadata identifying the video cameras, time stamps, and/or locations of the video cameras.

By way of example, as illustrated in FIG. 1, video camera 102 may be disposed proximate to stadium entrance 103 and may be configured to capture the presence and movement of queued customers 104. The stadium may, in some instances, host sporting events in accordance with a predetermined schedule, and video camera 102 may be configured to capture video content prior to and during each of the hosted sporting events. For instance, each sporting event may be associated with a corresponding start time, e.g., 5:00 p.m., and video camera 102 may be configured to capture digital video content indicative of customer activity at stadium entrance 103 for a predetermined time period prior to the start time and throughout the sporting event. In some aspects, video camera 102 may transmit portions of the captured digital video content, e.g., digital video data 105, to video processing system 120, which may store the transmitted portions of the digital video content to establish a time-varying record of customer activity at stadium entrance 103 throughout one or more of the prior sporting events.

In some implementations, video processing system 120 may receive digital video data 105, and may store digital video data 105 within a portion of a locally accessible data repository, such as digital video data storage 121. For example, digital video data 105 may include portions of digital video content captured by video camera 102 during one or more prior time periods, and as described above, may also include data or metadata that identifies video camera 102, one or more time stamps associated with the portions of the digital video content, and/or a location of video camera 102. In some aspects, video processing system 120 may receive portions of digital video data 105 directly from video camera 102 and/or from the one or more additional video cameras. In other aspects, video processing system 120 may receive portions of digital video data 105 from a video management system associated with a surveillance system, which may receive and process digital video content captured by video camera 102 and/or the additional video cameras prior to transmission to video processing system 120.

Digital video data storage 121 may include structured data records associated with portions of the digital video data received from video camera 102, e.g., digital video data 105, and from the one or more additional video cameras. For example, upon receipt of digital video data 105, video processing system 120 may process digital video data 105 to extract the data or metadata that identifies video camera 102, the time stamp associated with the transmitted portion of the digital video content, and/or the location of video camera 102, which video processing system 120 may include within a corresponding one of the structured data records within digital video data storage 121. Additionally, in some instances, video processing system 120 may store the digital video content captured by video camera 102 within digital video data storage 121, and associate a location of the stored digital video content with the corresponding structured data record. Video processing system 120 may perform similar operations to process and store subsequent portions of digital video data received from video camera 102, and additionally or alternatively, to process and store digital video data received from the one or more additional video cameras, which may be associated with the stadium's surveillance systems and disposed at various locations inside and outside of the stadium.

As described above, digital video data storage 121 may include digital video content captured by video camera 102, and additionally or alternatively, by the one or more additional video cameras at various times and dates, such as before and during various sporting events held at the stadium. In certain aspects, the stored digital video content may establish a time-varying record of customer activity not only at entrance 103, but also at locations associated with the additional cameras, throughout the various sporting events. For example, the stored digital video content may identify a presence of queued customers 104 at stadium entrance 103 prior to and throughout the various sporting events. In other examples, the stored digital video data may capture queued customers awaiting service at one or more concession stands in the stadium, queued vehicles awaiting entry to a parking facility of the stadium, and additionally or alternatively, a presence of objects, such as unattended bags, in certain portions of the stadium prior to and throughout the various sporting events.

In some implementations, video processing system 120 may apply one or more video analytics to portions of the digital video content stored within digital video data storage 121, and based on an outcome of the application of the video analytics, detect one or more events shown within the portions of the stored video content. As described above, the detected events may correspond to a presence or movement of a particular object, individual, or groups of objects or individuals within the portions of the stored digital video content, and each of the detected events may be associated with a corresponding detection time. Further, in additional aspects, each of the detected events may be characterized by one or more event parameters, the values of which may be established by video processing system 120 based on the application of the video analytics.

In some aspects, video processing system 120 may obtain, from digital video data storage 121, a portion of the stored digital video content that was captured by video camera 102, e.g., digital video content 130A, and a video analytics module 122 may apply the one or more video analytics to digital video content 130A to detect occurrences of certain events, to identify detection times associated with the detected events, and further, to determine event parameter values that characterize the detected events. The applied video analytics may include, but are not limited to, one or more processes for detecting, classifying, recognizing, counting, and/or tracking objects within frames of digital video content 130A, one or more image acquisition processes, and one or more facial- and textual-recognition processes.

For example, based on an application of the one or more processes for detecting, classifying, recognizing, and/or tracking objects to digital video content 130A, video analytics module 122 may detect objects, such as individuals, vehicles, or luggage, occurring within frames of digital video content 130A and further, monitor a trajectory, speed, and travel time of these detected objects as they move within successive frames of digital video content 130A. Further, and based on an application of the one or more object-counting processes to digital video content 130A, video analytics module 122 may determine or "count" numbers of these objects occurring within the frames of digital video content 130A, and additionally or alternatively, a number of these objects that cross virtual lines disposed within the frames of digital video content 130A. Additionally, video analytics module 122 may apply the facial- and textual-recognition algorithms to identify faces of individuals and textual content, such a license plate, within the digital video content 130A. In other implementations, video analytics module may apply any additional or alternate set of video analytics that would be appropriate to the stored digital video content and to video processing system 120.

By way of example, digital video content 130A may include portions of the digital video content captured by video camera 102 during a temporal window extending from an hour before to an hour after a start time of each of the sporting events, and may also include portions of the stored data or metadata that identify video camera 102, video camera 102's location, and corresponding time stamps of the captured digital video content. Video analytics module 122 may apply the one or more video analytics to digital video content 130A, and based on an outcome of the application of the video analytics, detect a presence of customers 104 queued at stadium entrance 103 at corresponding detection times within the temporal window associated with each of the sporting events. Video analytics module 122 may also determine a number of customers queued at entrance 103 at each of the detection times, and may establish these determined numbers of queued customers as event parameter values that characterize the detected events. In some aspects, video analytics module 122 may generate data indicative of an outcome of the application of the video analytics, e.g., detected event data 130B, that includes, but is not limited to, data identifying the one or more detected events, the corresponding detection times, and the one or more established event parameter values.

In additional implementations, one or more of the events detected by video analytics module 122 may reflect or be indicative of various real-world conditions or events, e.g., external events. For example, the determined numbers of customers queued at entrance 103 at various times during the temporal window associated with a sporting event on May 19, 2016, may be related to or indicative of external events that include, but are not limited to, a total attendance at the May $19^{th}$ sporting event, a total number of customers served by and/or a total concession revenue of by the stadium's concession stands during the May $19^{th}$ sporting event, and a total parking revenue collected from customers during the May $19^{th}$ sporting event.

In certain aspects, video camera 102 and the one or more additional video cameras may be incapable of capturing these external events, and as such, video processing system 120 may be incapable of characterizing the external events through the video-analytical processes described above. For example, the external event may represent a total attendance at a sporting event held at the stadium on May $19^{th}$, and video processing system 120 may be unable to estimate accurately the total attendance the sporting event based solely on the digital video content captured by video camera 102 and the additional video cameras.

In one implementation, a third party may be capable of determining and/or observing values of the event parameters that characterize the one or more external events, such as the total attendance of the sporting events described above. For example, a business entity associated with the stadium (e.g., an owner of a baseball team) may objectively establish a total attendance for each of the sporting events based on a number of tickets sold to customers and additionally or alternatively, a number of customers that passed through mechanical turnstiles disposed at stadium entrances or whose tickets were processed by hand-held computing devices operated by stadium personnel (e.g., by scanning an optically readable code, such as a QR code, on the customers' tickets). In some instances, one or more computing systems maintained by the third parties (not shown in FIG. 1) may store data identifying the external events and the values of the external event parameters that characterize the external events, and portions of the stored data may be transmitted to video processing system 120 at predetermined intervals or in response to requests from video processing system 120 (e.g., as received through a corresponding API or other programmatic interface).

Video processing system 120 may receive the data identifying the external events and the external event parameter values, and may store portions of the received data within structured data records of a corresponding data repository, e.g., external event data storage 123. For example, and as described above, video processing system 120 may receive data identifying the total attendance established for the one or more prior sporting events held at the stadium, including the May 19$^{th}$ sporting event, and may store portions of the received data within corresponding structured data records of external event data storage 123, along with data identifying the dates and/or times of each of the sporting events.

In other implementations, video processing system 120 may determine or devise at least one of the external events based on portions of the captured digital video content, e.g., as stored within digital video data storage 121. For example, one of the external events may represent a static event, such as a total number of vehicles parked in a corresponding lot, and video processing system 120 may process digital video content captured by one or more video cameras surrounding the corresponding lot using any of the exemplary processes described above (e.g., through the application of various video analytics) to determine the total number of parked vehicles In some aspects, video processing system 120 may store data identifying the determined or derived external event within external event data storage 123.

In certain aspects, and based on an application of the video analytics to video content data 130A, video analytics module 122 may detect one or more events occurring at corresponding detection times within video content data 130A, and further, may establish one or more event parameter values that characterize the detected events. As described above, video analytics module 122 may generate outcome data, e.g., detected event data 130B, that identifies the detected events, the corresponding detection times, and the one or more event parameter values. Further, in some aspects, video processing system 120 may also access external event data storage 123 and obtain data, e.g., external event data 130C, identifying and characterizing one or more of the external events that are associated with the detected events. For example, as described above, detected event data 130B may identify numbers of customers 104 queued at stadium entrance 103 at various times during each of a number of prior sporting events held at the stadium, and in some instances, external event data 130C may identify the established total attendance for each of the prior sporting events.

In some implementations, a model generation module 124 may generate a predictive model that correlates time-varying event parameter values of the detected and external events during a prior time period (e.g., a first time period), and that predicts an expected value of one or more of the event parameters that characterize the external event during a future time period (e.g., a second time period). By way of example, video processing system 120 may obtain detected event data 130B, which identifies and characterizes events detected by video analytics module 122 within digital video content during the first time period, and external event data 130C, which identifies and characterizes external events associated with the detected events. As described above, detected event data 130B may include detection times and event parameter values that characterize each of the detected events, and external event data 130C may include the external event parameter values that characterize each of the associated external events.

In some aspects, model generation module 124 may receive, as inputs, detected event data 130B and external event data 130C, and a machine learning module 126 may apply one or more machine learning algorithms to the time-varying event parameter values that characterize the detected and external events during the prior time period, e.g., as included within event data 130B and external event data 130C. Based on an output of the one or more machine learning algorithms, machine learning module 126 may establish a correlation between the time-varying event parameter values that characterize the detected events during the first time period and time-varying event parameter values that characterize the external events associated with each of the detected events. In some instances, machine learning module 126 may establish a function representative of the established correlation and thus, the underlying relationship between the time-varying event parameter values that characterize the detected and external event parameters during the prior time period, and an expected relationship between these values during the future time periods.

For example, and as described above, detected event data 130B may identify a number of customers queued at entrance 103 at the corresponding detection times during a number of prior sporting events held at the stadium, and external event data 130C may include a total attendance established for each of the prior sporting events. In some aspects, machine learning module 126 may apply the one or more machine learning algorithms to the numbers of queued customers and the total established attendances during the prior sporting events, and based on an outcome of the one or more machine learning algorithms, establish a correlation between the numbers of customers queued at entrance 103 during the sporting events and the total attendance established for the sporting events. Further, and as outlined above, machine learning module 126 may establish a function representative of the established correlation between the number of queued customers at entrance 103 and the total established attendances for the prior sporting events.

Model generation module 124 may, in certain aspects, generate the predictive model in accordance with the established correlation, and may output data, e.g., predictive model data 130D, that reflects the established correlation and the generated functional representation. For example, the predictive model may accept, as an input, one or more event parameter values that characterize an additional event detected at a corresponding detection time, and may generate, as output, an expected value of an external event parameter that characterizes the external event associated with the corresponding detection time.

Further, in some implementations, video processing system 120 may receive additional portions of digital video content captured by video camera 102, e.g., as digital video data 105, and video processing system may store the additional portion of the captured digital video content within digital video data storage 121. Further, and using any of the exemplary processes described above, video analytics module 122 may detect an additional event occurring within the digital video content at a corresponding detection time, and establish one or more event parameter values that characterize the additional detected event. Additionally, and as described above, video analytics module 122 may generate data, e.g., additional event data 130E, identifying the additional detected event, its corresponding detection time, and the established values of the one or more event parameters.

For example, video camera 102 may capture additional digital video content prior to a sporting event held at the stadium on May 20, 2016, which may occur subsequent to the prior sporting events held at the stadium and described above. The captured digital video content may identify customers queued at entrance 103 to gain entry to the stadium, and using any of the exemplary processes described above, video analytics module 122 may detect a presence and number of the queued customers at a corresponding detection time within the additional digital video content, and may populate additional event data 130E with data identifying the presence of the queued customers, the established number of queued customers, and the corresponding detection time.

In some implementations, an event prediction module 128 may access predictive model data 130D, and may apply the predictive model to portions of additional event data 130E. For example, event prediction module 128 may access additional event data 130E, and may extract portions of the data that identify the value of the additional event parameter and the time and date of detection, which may be provided as inputs to the predictive model. In certain aspects, and in response to the application of the predictive model to the portions of additional event data 130E, event prediction module 128 may generate data, e.g., output data 130F, that identifies an expected value of the one or more external event parameters that characterize the external event.

By way of example, additional event data 130E may specify that 445 customers are queued at entrance 103 at a corresponding detection time prior to the May 20$^{th}$ sporting event at the stadium. Based on an application of the predictive model to portions of additional even data 130E (e.g., the 445 queued customers at the corresponding detection time), event prediction module 128 may predict an expected total attendance of 44,895 for the May 20$^{th}$ sporting event, and event prediction module 128 may populate outcome data 130F with the expected total attendance.

Video processing system 120 may, in certain aspects, transmit portions of output data 130F to communications device 110 across any of the communications networks described above. For example, the transmitted portions of output data 130F may identify the expected value of the external event parameter, e.g., the total attendance of 44,895 for the May 20$^{th}$ sporting event, and communications device 110 may execute one or more applications programs that present a representation of the expected total attendance to a user 101 through a corresponding interface. For example, communications device 110 may present the representation of the expected total attendance to user 101 through a portion of a web page or other graphical user interface (GUI), and additionally or alternatively, through a voice-user interface (VUI) that may leverage a virtual digital assistance functionality of communications device 110.

Additionally, in some implementations, communications device 110 may additionally perform operations upon receipt of data identifying the expected value of the external event parameter. By way of example, the expected value of the external event parameter, e.g., the expected total attendance of 44,895 for the May 20$^{th}$ sporting event, may exceed an anticipated value and may thus be inconsistent with a prior allocation of resources. In certain aspects, communications device 110 may execute one or more application programs that, either independently or in conjunction with other external computing systems (e.g., associated with various vendors), adaptively and automatically adjust the allocation of resources to match the expected attendance. For instance, the executed application programs may perform operations that re-allocate human resources, such as stadium attendant, security, and/or parking staff, to various locations within the stadium to reflect the expected total attendance, and further, may re-allocate a distribution of supplies to various concession stands and retail outlets within the stadium to reflect the expected total attendance.

Figure 2:
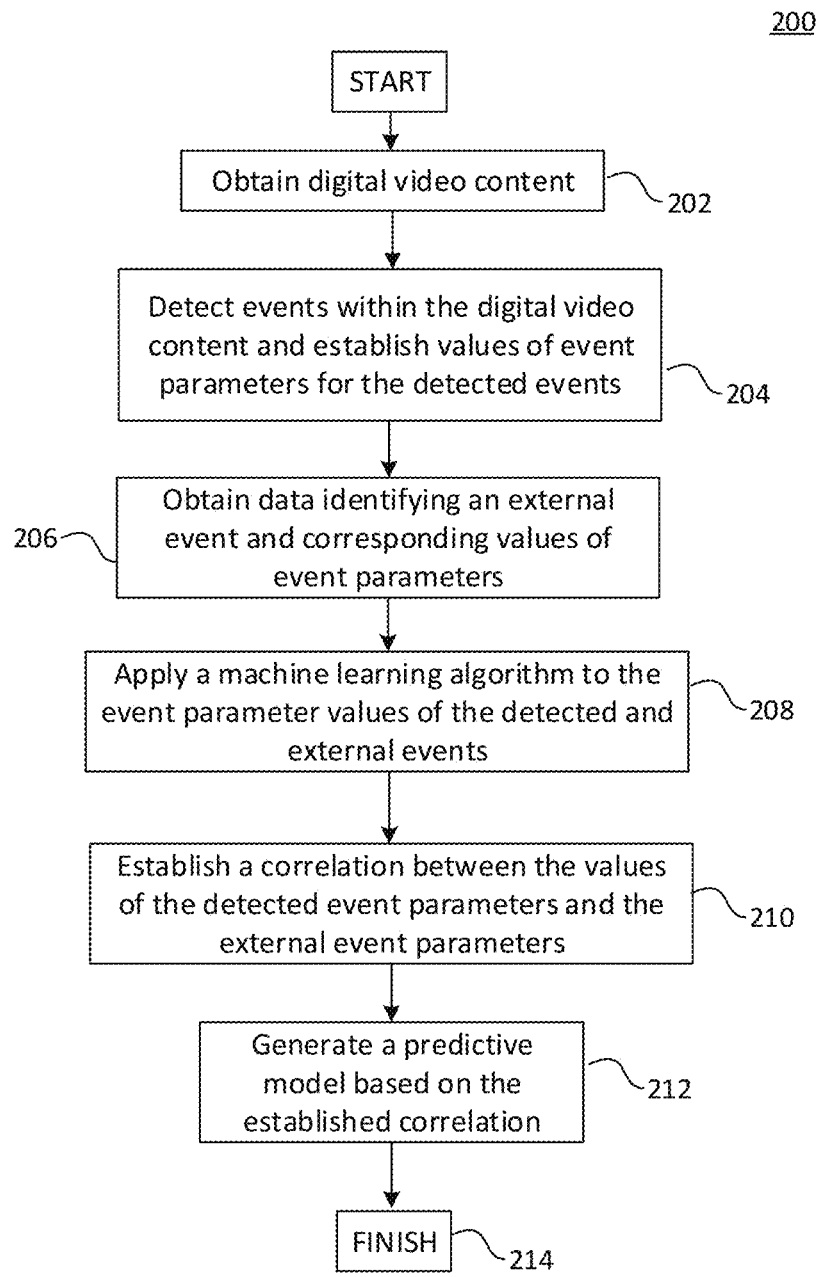
FIG. 2 is a flowchart of an example process for generating a predictive model based on events detected within captured digital video content.

FIG. 2 is a flowchart 200 of an example process for establishing a predictive model based on events detected within digital video content. In certain aspects, a computing system, e.g., video processing system 120, may perform the steps of example process 200. For example, video processing system 120 may perform operations that detect events occurring within portions of digital video content captured by one or more video cameras during a particular time period, obtain data identifying one or more external events associated with the detected events, apply one or more machine learning algorithms to event parameter values that characterize the detected and external events, and based on an outcome of the applied machine learning algorithms, correlate values of certain ones of the detected and external event parameters to generate a model that predicts expected values of the external event parameter during the particular time period and other time periods.

In some aspects, video processing system 120 may obtain digital video content captured by one or more video cameras during one or more time periods (e.g., in step 202). For example, and as described above, video processing system may receive and store digital video data within corresponding portions of a data repository, such as digital video data storage 121 of FIG. 1. In some aspects, video processing system 120 may access digital video data storage 121 and in step 202, may obtain portions of the stored digital video data that correspond to digital video content captured by a subset of the one or more video cameras, e.g., video camera 102, during the one or more time periods.

Video processing system 120 may also perform operations that detect events that occur within the obtained digital video content, and establish values of event parameters that characterize the detected events (e.g., in step 204). For example, video processing system 120 may apply one or more of the video analytics described above to the obtained digital video content, and based on an outcome of the application of the video analytics, may detect certain events occurring at corresponding detection times within the digital video content and establish event parameter values that characterize these detected events using any of the exemplary processes described above. Further, in some instances, video processing system 120 may generate data indicative of an outcome of the application of the video analytics that includes, but is not limited to, data identifying the detected events, the corresponding detection times, and the established event parameter values.

For example, as described above, the detected events may include, but are not limited to, a presence within the captured digital video content of queued individuals, a presence or movement of individuals and/or vehicles into and within a restricted or unrestricted area through corresponding entrances, and a presence or movement of objects, such as luggage, within a particular area. Further, in additional aspects, the event-parameter values that characterize these detected events may include a number of the queued individuals, a location of the queued individuals, a number of individuals or vehicles entering the restricted or unrestricted area, and a location, speed, and/or trajectory of the objected within the particular areas.

In additional aspects, video processing system 120 may also obtain data, e.g., external event data, that identifies an external event and values of one or more event parameters that characterize the external event during the prior time period or time periods (e.g., in step 206). For example, and as described above, an external event may represent a real-world condition or event that may be observed and quantified objectively through corresponding event parameters, and examples of external events may include, but are not limited to, a number of attendees of at a particular event, a number of customers served by a business entity during a particular time period, and a number of vehicles disposed within a particular parking lot, e.g., an airport parking lot.

In some instances, video processing system 120 may receive data identifying and characterizing various external events from one or more computer systems maintained by third-party entities, such as business, governmental agencies, transit agencies, etc., and may store portions of the received data within structured data records of a data repository, e.g., external event data storage 123 of FIG. 1. Video processing system 120 may access external event data storage 123, and in step 206, may obtain portions of the stored data that characterize at least one of the external events having a relationship with the detected events. For example, the obtained external event data may include information that identifies the at least one related external event and one or more external event parameter values that characterize the at least one external event during the particular time period or time periods.

For example, and as described above, video processing system 120 may detect a presence of queued customers at a particular entrance of a stadium prior to scheduled sporting events, and the established event parameter values may specify a number of queued customers at various times throughout the particular time period or time periods. In certain instances, the external event related to these detected events may include a total attendance at the stadium during each of the scheduled sporting events, and the obtained external event data may identify the external event, i.e., the total attendance, and include external event parameter values that specify the total attendance values.

Video processing system 120 may also apply one or more machine learning algorithms to the event parameter values that characterize the detected and external events during the prior time period or time periods (e.g., in step 208). For example, and as described above, video processing system 120 may access data identifying the detected events, the corresponding times of detection, and further, the event parameter values that characterize these detected events at the corresponding detection times. Further, and consistent with the implementations described above, the obtained external event data may identify the external event related to the detected events, and may further identify values of the external event parameters that characterize the external event during the particular time period or time periods that include the corresponding detection times.

In some aspects, using any of the processes described above, video processing system 120 may apply the one or more machine learning algorithms to the time-varying event parameter values that characterize the detected and external events during the prior time period or time periods, and based on an output of the one or more machine learning algorithms, video processing system 120 may establish a correlation between these time-varying event parameter values (e.g., in step 210). In certain instances, and as described above, video processing system 120 may establish a function representative of the established correlation and thus, the underlying relationship between the time-varying event parameter values that characterize the detected and external event parameters during the prior time period or periods, and an expected relationship between these values during one or more future time periods.

For example, the detected event data may identify a number of customers queued at the stadium entrance at the corresponding detection times prior to a number of prior sporting events held at the stadium, and the external event data may include a total attendance established for each of the prior sporting events. In some aspects, video processing system 120 may apply the one or more machine learning algorithms to the numbers of queued customers and the total established attendances during the prior sporting events (e.g., in step 208), and based on an outcome of the one or more machine learning algorithms, establish a correlation between the numbers of customers queued at the stadium entrance during the sporting events and the total attendance established for the sporting events (e.g., in step 210). Further, and as outlined above, video processing system 120 may establish a function representative of the established correlation between the number of queued customers at the stadium entrance and the total established attendances for the prior sporting events.

In additional aspects, video processing system 120 may generate the predictive model in accordance with the established correlation, and may output data, e.g., predictive model data, that reflects the established correlation and the generated representative function (e.g., in step 212). For example, the predictive model may accept, as an input, one or more event parameter values that characterize an additional event detected at a corresponding detection time, and may generate, as output, an expected value of an external event parameter that characterizes the external event at the corresponding detection time. Exemplary process 200 may then be complete in step 214.

In some implementations, video processing system 120 may continue to receive and store digital video data captured by the one or more video cameras. For example, video camera 102 may generate digital video content that captures a presence of customers 104 queued at stadium entrance 103 at a particular time before one or more additional or alternate sporting events at the stadium, and video camera 102 may transmit portions of the digital video content to video processing system 120. Using any of the exemplary processes described above, video processing system 120 may apply video analytics to the digital video content to detect an additional event occurring within the digital video content at a corresponding detection time, e.g., a presence of queued customers 104 at stadium entrance 103 prior to the additional sporting event, and establish an event parameter value that specifies the number of customers queued at the stadium entrance. As described below in reference to FIG. 3, video processing system 120 may apply the predictive model to event parameter value of the additional detected event and the corresponding detection time, and based on an outcome of the predictive model, define an expected value of an external event parameter that characterizes the external event.

Figure 3:
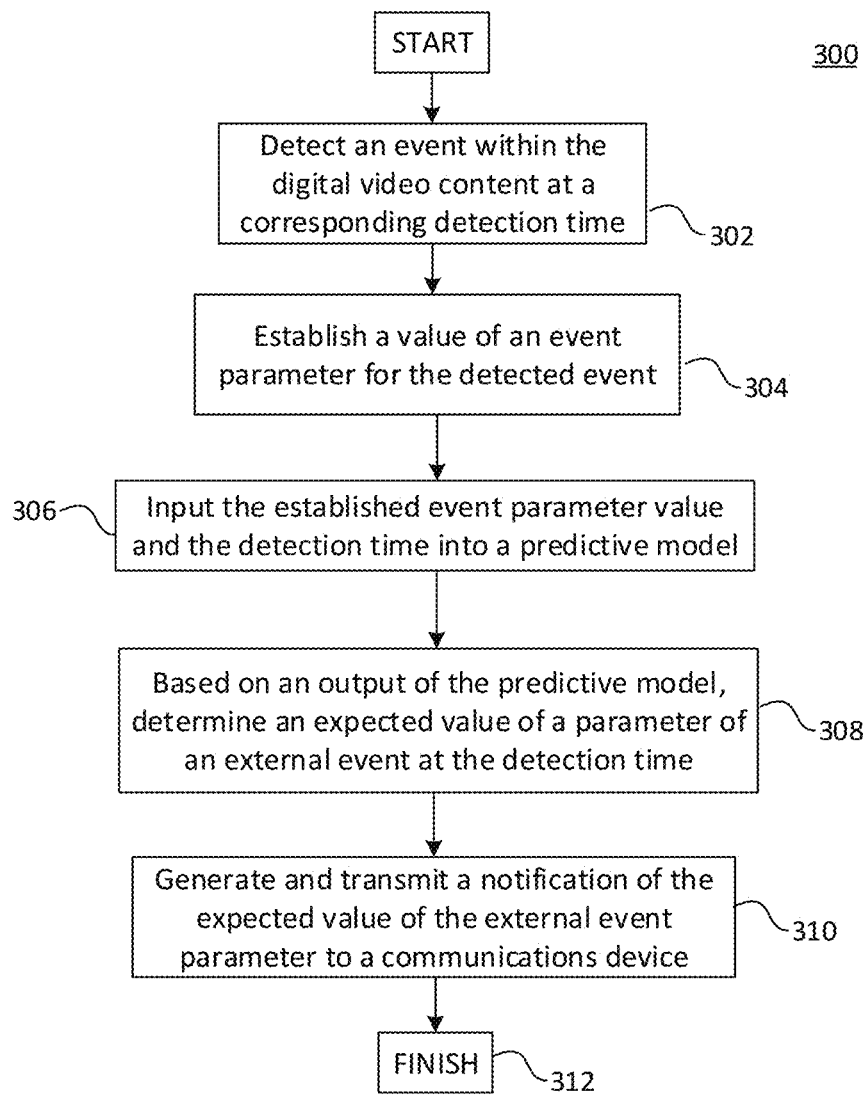
FIG. 3 is a flowchart of an example process for predicting an expected value of an event parameter based on events detected within captured digital video content.

FIG. 3 is a flowchart of an exemplary process 300 for predicting expected values of external event parameters based on detected occurrences of events within digital video content. In certain aspects, a computing system, e.g., video processing system 120, may perform the steps of example process 300. For example, video processing system 120 may perform operations that detect an occurrence of an additional event at a corresponding detection time within received digital video content, establish an event parameter value that characterizes the additional detected event at the corresponding detection time, and based on an application of a predictive model to the established event parameter value, predict an expected value of an external event parameter that characterizes the external event at the corresponding detection time.

In some aspects, video processing system 120 may detect an event, e.g., an additional event, occurring within stored digital video content captured by one or more video cameras at a corresponding detection time (e.g., in step 302), and may establish an event parameter value that characterizes the detected event at the corresponding detection time (e.g., in step 304). For instance, video processing system 120 may receive and store additional portions of digital video content captured by one or more video cameras, such as video camera 102. Using any of the exemplary processes described above, video processing system 120 may apply the one or more video analytics to the additional digital video content, and based on an outcome of the applied video analytics, detect the additional event occurring within the additional digital video content at the corresponding detection time (e.g., in step 302) and establish the event parameter value for the additional detected event (e.g., in step 304).

For example, and as described above, video camera 102 may generate and transmit to video processing system 120 additional digital video content that captures a presence of customers 104 queued at stadium entrance 103 prior to an additional sporting event at the stadium. In some instances, video processing system 120 may detect a presence of the queued customers the additional digital video content (e.g., the additional detected event), and may establish a number of customers queued at the stadium entrance (e.g., the event parameter value for the additional detected event). For example, video processing system 120 establish that 445 customers are queued for entry into the stadium at one hour prior to the additional sporting event.

Additionally, in some aspects, video processing system 120 may access a predictive model that correlates time-varying event parameter values that characterize various detected and external events during a prior time period, and that predicts an expected value of an external event parameter that characterizes the external event during a future time period. In some aspects, video processing system 120 may apply the predictive model to the event parameter value and the detection time of the additional detected event (e.g., in step 306), and based on an outcome of the predictive model, video processing system 120 may determine the expected value of the external event parameter value that characterizes the external event at the corresponding detected time (e.g., in step 308).

For example, the accessed predictive model may correlate detected numbers of queued customers at stadium entrance 103 throughout prior sporting events (e.g., at corresponding detection times before or during the prior sporting events) with established total attendances at the prior sporting events. As described above, video processing system 120 may establish that 445 customers are queued at stadium entrance 103 at a corresponding detection time (e.g., 4:00 p.m.) prior to the additional sporting event, and based on an application of the predictive model to the established number of queued customers and the corresponding detection time, may predict an expected total attendance of 44,895 for the additional sporting event.

Video processing system 120 may, in certain aspects, perform operations that transmit data identifying the expected value of the external event parameter to communications device 110 (e.g., in step 310). As described above, the transmitted data may identify the expected event parameter value, e.g., the total attendance of 44,895 for the additional sporting event, and communications device 110 may execute one or more applications programs that present a representation of the expected total attendance to a user 101 through a corresponding interface. For example, communications device 110 may present the representation of the expected total attendance to user 101 through a portion of a web page or other graphical user interface (GUI), and additionally or alternatively, through a voice-user interface (VUI) that may leverage a virtual digital assistance functionality of communications device 110. Exemplary process 300 may then be complete in step 312.

As described above, video processing system 120 may generate a predictive model that correlates time-varying event parameter values characterizing detected and external events during a prior time period, and that predicts an expected value of one or more of external event parameters that characterize the external event during a future time period. For example, and as described above, video processing system 120 may establish the correlation based on an application of one or more adaptive, machine-learning algorithms to (i) the time varying event parameter values that characterize events detected within digital video content at corresponding detection times within the prior time period and (ii) event parameter values that characterize an external event during the prior time periods.

In additional implementations, video processing system 120 may input labelled training data into the predictive model at predetermined intervals or in response to particular events (e.g., a variance between predicted and actual external event parameters exceeds a threshold variance) to facilitate supervised or unsupervised learning, which may refine and improve an accuracy of the predictive model. For example, and as described above, video processing system 120 may establish that 445 customers are queued at stadium entrance 103 at a corresponding detection time prior to a sporting event, and based on an application of the predictive model to the established number of queued customers and the corresponding detection time, may predict an expected total attendance of 44,895 for the sporting event. In some aspects, video processing system 120 may receive, e.g., from the one or more third-party computing systems described above, data indicating an established total attendance of 43,587 for the sporting event, and may determine that the expected total attendance varies from the established total attendance by 1,308 customers (or 2.9% of the estimated total attendance).

In some aspects, video processing system 120 may provide data identifying the detected event and corresponding event parameter value (e.g., 445 customers are queued at stadium entrance 103), the corresponding detection times, the expected and established external event parameter values (e.g., the expected total attendance of 44,895 and the established total attendance of 43,587) to the predictive model as training data. For example, video processing system 120 may apply the one or more machine learning algorithms to the training data to generate additional output that more refines the correlation between the time-varying values of the event parameters characterizing detected and external events and improve the accuracy of the predictive model.

Further, in some implementations, video processing system 120 may establish a predictive model that computes an expected value of an external event parameter based on a determined single event parameter value that characterizes a single detected event. The digital video content captured by the one or more video cameras may, however, include multiple events characterized by values of multiple event parameters. For example, while video camera 120 may be configured to capture a presence and/or movement of one or more customers 104 queued at stadium entrance 103, one or more additional video cameras may capture a presence and/or movement of one or more customers queued at other stadium entrances. Further, in and additional examples, the additional video cameras may be disposed proximate to various concession stands and team stores within the stadium, and may be configured to capture a presence and/or movement of customers queued at or within the various concession stands and team stores. Additionally or alternatively, the one or more cameras may be disposed at entrances to parking garages or parking lots that serve the stadium, and may capture video a presence of various vehicles entering or exiting the parking garages or parking lots.

In additional implementations, and using any of the processes described above, video processing system 120 may apply the one or more video analytics to the digital video content captured by video camera 102 and/or the additional video cameras, and based on an outcome of the application of the video analytics, detect occurrences of multiple events at corresponding detection times within the digital video content, and establish event parameter values that characterize the multiple detected events at the corresponding detection times. For example, and based on the applied video analytics, video processing system 120 may establish a number of customers queued at various stadium entrances, a number of customers queued at various concession stands and team stores, and a number of vehicles entering various parking garages at corresponding times during a prior time period.

Using any of the exemplary processes described above, video processing system 120 may generate multiple predictive models, each of which may correlate time-varying event parameter values that characterize a corresponding one of the detected events with time-varying event parameter values of an external event during the prior time period. Video processing system 120 may, in some aspects, apply one or more of these multiple predictive models to event parameter values and detection times associated with the additional detected events, and may generate a set of model-specific expected values for the external event parameter. Video processing system 120 may also obtain an observed value for the external event parameter (e.g., an observed attendance at a sporting event obtained from one or more of the third-party computer systems described above), and may compute variances between the observed value of the external event parameter and each of the set of model-specific expected values of the external event parameter.

For example, video processing system 120 may identify a minimum of the computed variances, and may determine a corresponding one of the predictive models that is associated with the minimum computed variance. In some aspects, video processing system 120 may identify the detected event, event parameter, and/or established event parameter value associated with the corresponding predictive model as a predictor of the external event parameter. In other examples, video processing system 120 may establish that a subset of the computed variances fall within a predetermined threshold variance, and may identify corresponding ones of the predictive models that are associated with the subset of the computed variances. Video processing system 120 may, in some instances, identify the detected event, event parameter, and/or established event parameter value associated with each of the corresponding predictive models as predictors of the external event parameter. Additionally or alternatively, video processing system 120 may provide the computed variances, the set of expected values of the external event parameter, and the event parameter values of the multiple detected events to the predictive model as training data, and video processing system 120 may perform any of the exemplary processes described above to refine the predictive model and reduce or minimize the computed variances.

In certain implementations, and as described above, video processing system 120 may detect an event, e.g., an additional event, occurring at a corresponding time within digital video content captured by one or more video cameras, and may apply a predictive model to an event parameter value that characterizes the additional detected event at the corresponding time to define an expected value of an external event. The expected value of the external event parameter, which may be not be detectable within the digital video content, may be provided to one or more communications devices for presentation within corresponding interfaces, such as graphical user interfaces (GUIs) and voice-user interfaces (VUIs).

In other implementations, video processing system 120 may apply the predictive model to event parameter values characterizing events detected within captured digital video content at various times during a first time period, and based on an outcome of the predictive model, video processing system 120 may predict one or more expected occurrences of these detected events at various times during a second time period. Video processing system 120 may detect an occurrence of additional events within the captured digital video content, may perform operations that determine whether the additional detected event represent a deviation from the expected occurrences, and thus, that the occurrence of the additional detected event represents an anomaly with the captured digital video content. If video processing system 120 were to establish that the additional detected event represents a deviation from the expected occurrences, and thus an anomaly, video processing system 120 may transmit data identifying the anomaly to one or more communications devices for presentation to corresponding users, as described below in FIG. 4.

Figure 4:
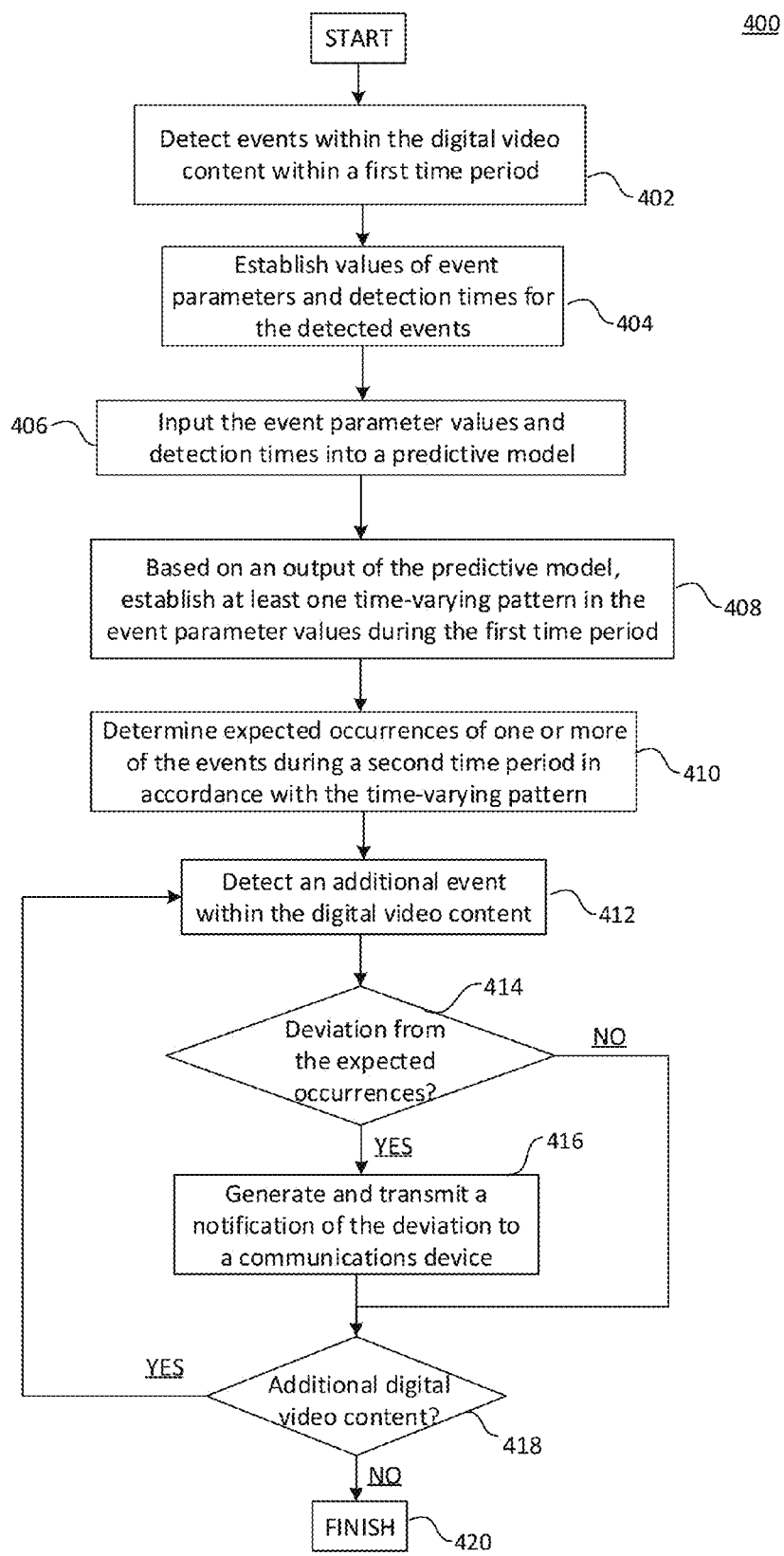
FIG. 4 is a flowchart of an example process for detecting anomalies within stored digital video content.

FIG. 4 is a flowchart of an example process 400 for identifying anomalies within digital video content captured by one or more video cameras. In certain aspects, a computing system, e.g., video processing system 120, may perform the steps of process 400. For example, video processing system 120 may perform operations that detect events shown within digital video content captured by one or more video cameras during a first time period, apply a predictive model to event parameter values that characterize a portion of the detected events during the first time period, identify expected occurrences of one or more of the detected events during a second time period based on an outcome of a predictive model, and determine whether an additional occurrence of one of the detected events within the captured digital video content represents a deviation from the expected occurrences during the second time period.

In some aspects, video processing system 120 may detect events shown within digital video content captured by one or more video cameras during a first time period (e.g., in step 402). For example, and as described above, video processing system 120 may receive and store digital video content captured by one or more video cameras within corresponding portions of a data repository, such as digital video data storage 121 of FIG. 1. In some aspects, video processing system 120 may access digital video data storage 121, may obtain portions of the stored digital video data that correspond to digital video content captured by a subset of the one or more video cameras, e.g., video camera 102, during the first time period. Using any of the processes described above, video processing system 120 may apply one or more video analytics to the obtained digital video content, and based on an outcome of the applied video analytics, may detect certain events shown within the obtained digital video content.

Additionally, and based on the outcome of the application of the applied video analytics, video processing system 120 may establish detection times for each of the detected events and one or more event parameter values that characterize the detected events at the corresponding detection times within the first time period (e.g., in step 404). By way of example, the detection time for a particular one of the events may correspond to a time at which the detected event is shown within the obtained digital video content. Further, and in some examples, the one or more cameras may be disposed within a restricted area, such as a secured area within an airport, and the detected events may include, but are not limited to, a presence or absence within the digital video content of individuals or objects, such as luggage, within portions of the secured area. Further, the one or more established event parameters may include, but are not limited to, a number of the detected individuals or objects, visual characteristics of the individuals or objects, e.g., red luggage, and speeds or trajectories of movement associated with the individuals or objects.

In certain aspects, as described above, video processing system 120 may access and apply a predictive model to the time-varying event parameter values that characterize a portion of the detected events during the first time period (e.g., in step 406). The predictive model may incorporate one or more machine learning algorithms, and additionally or alternatively, one or more data mining algorithms, and video processing system 120 may access or generate the predictive model using any of the processes described above. For instance, when applying the predictive model in step 406, video processing system 120 may apply the one or more machine learning algorithms and/or data mining algorithms to the time-varying event parameter values that characterize the portion of the detected events during the first time period, Based on the outcome of the applied machine learning algorithms and/or data mining algorithms, video processing system 120 may establish an existence of a time-varying pattern among the event parameter values during the first time period (e.g., in step 408), and may generate data that identifies expected occurrences of one or more of the detected events during a second time period (e.g., in step 410). In certain aspects, the second time period may occur after the first time period, and video processing system 120 may determine one or more of the expected occurrences during the second time period in accordance with the established time-varying pattern among the detected event parameter values during the first time period.

For example, the detected events may include a presence or absence of a particular object, such as an unattended piece of luggage, within a particular area of the airport, such as a ticketing counter. The values of the event parameters for these detected events may include a number of unattended pieces of luggage, with a value of zero being indicative of an absence of unattended luggage near the ticketing counter. In some examples, the ticketing counter may operate daily between 8:00 a.m. and 8:00 p.m., and the time-varying pattern established by video processing system 120 in step 408 may indicate a negligible likelihood that one or more individuals leave luggage unattended near the ticketing counter throughout these operating hours over the first time period, such as the prior month. In accordance with the established time-varying pattern, video processing system 120 may establish expected occurrences of one or more of the detected events during a second time period, e.g., a coming week. For example, in step 410, video processing system 120 may generate data identifying expected occurrences of events reflecting an absence of all unattended luggage near the ticketing counter between the hours of 8:00 a.m. and 8:00 p.m. in the coming week.

Referring back to FIG. 4, and using any of the exemplary processes described above, video processing system 120 may detect an occurrence of an additional event at a corresponding detection time within the stored digital video content (e.g., in step 412). For example, video processing system 120 may receive additional digital video content captured by the one or more video cameras, which may be disposed proximate to one of the ticketing counters of the airport, and the additional detected event may correspond to a presence or absence unattended luggage near the ticketing counter, e.g., as shown within the additional digital video content. In other instances, the additional detected event may include, but is not limited to, a detected presence of an unexpected object within a portion of the additional digital video content, a detected removal of an expected object within a portion of the additional digital video content, or a detection of smoke or flames within a portion of the additional digital video content. Further, and as described above, video processing system 120 may also establish a value of an event parameter for the additional detected events, such as a number of pieces of unattended luggage, and the corresponding detection time.

In some aspects, video processing system 120 may determine whether the occurrence of the additional detected event represents a deviation from the expected occurrences during the second time period (e.g., in step 414). If video processing system 120 were to determine that the occurrence of the additional detected event represents a deviation from the expected occurrences (e.g., in step 414; YES), video processing system 120 may generate and transmit data identifying the deviation to a communications device, e.g., communications device 110 (e.g., in step 416).

Figure 5A:
FIGS. 5A and 5B illustrate portions of stored digital video content.

For example, as illustrated in FIG. 5A, video processing system 120 may detect the occurrence of the additional detected event within one or more frames 500 of the captured digital video content, and the additional occurrence may correspond to a presence of a single, large piece of unattended luggage, e.g., luggage 502, disposed behind a column near the ticketing counter of the airport. In certain aspects, video processing system 120 may determine that the occurrence of the additional detected event, e.g., the unattended luggage near the ticketing counter, represents a deviation from the expected occurrences of events reflecting an absence of all unattended luggage near the ticketing counter (e.g., step 414; YES).

As described above, and in response to the determination that the additional detected event represents the deviation, video processing system 120 may generate and transmit data identifying the deviation, e.g., the unattended luggage near the ticketing counter, and additionally or alternatively, a portion of the captured digital video content that depicts the deviations, e.g., one or more frames 500 in FIG. 5A. In some aspects, communications device 110 may execute one or more applications programs that present a representation of the deviation and/or the frames of captured digital video content expected total attendance to a user 101 through a corresponding interface, such as a portion of a web page or other graphical user interface (GUI), and additionally or alternatively, through a voice-user interface (VUI) that may leverage a virtual digital assistance functionality of communications device 110.

Referring back to FIG. 4, video processing system 120 may determine whether additional portions of captured digital video content within digital video data storage 121 require analysis (e.g., in step 418). If video processing system 120 were to determine that digital video data storage 121 includes additional, unanalyzed digital video content (e.g., step 418; YES), exemplary process 400 may pass back to step 412, and video processing system 120 may detect additional occurrences of the detected events within the stored digital video content using any of the exemplary processes described above. If, however, video processing system 120 were to determine that digital video data storage 121 includes no additional unanalyzed digital video content (e.g., step 418; NO), then exemplary process 400 may be complete in step 420.

Figure 5B:

Referring back to step 414, If video processing system 120 were to determine that the occurrence of the additional detected event does not represent a deviation from the expected occurrences (e.g., in step 414; NO), exemplary process 400 may pass to step 418, and video processing system 120 may determine whether additional portions of captured digital video content within digital video data storage 121 require analysis using any of the example processes described above. For example, as illustrated in FIG. 5B, one or more frames 540 of the captured digital video content may establish an absence of any unattended luggage near the ticketing counter of the airport, which video processing system 120 may deem consistent with the expected occurrences of events reflecting an absence of all unattended luggage near the ticketing counter.

In certain aspects, video processing system 120 may detect an occurrence of additional events within the captured digital video content, may perform operations that determine whether the additional detected event represent a deviation from the expected occurrences, and thus, that the occurrence of the additional detected event represents an anomaly within the captured digital video content. In other implementations, video processing system 120 may establish one or more groups of events, e.g., event groups, expected to characterize portions of the detected events, and determine that the additional detected event represents an anomaly within the captured digital video content when video processing system 120 determines that none of the event groups characterize the additional detected event. In some instances, the event groups may include one or more predetermined groups, which may be established by an organization that maintains video processing system 120. In other instances, and using any of the processes described above, video processing system 120 may adaptively establish one of more of the events groups based on an application of the machine learning and/or data mining algorithms to data identifying the detected events.

By way of example, and using any of the processes described above, video processing system 120 may detect events shown within captured digital video content that include time-varying numbers of customers queued at an entrance to the stadium, e.g., stadium entrance 103. Video processing system 120 may establish, and additionally or alternatively, obtain data identifying, one or more event groups expected to characterize the detected, time-varying numbers of customers. For instance, the event groups may include, but are not limited to, standing customers, customers that lean against other customers or physical objects, and seated customers. Video processing system 120 may also detect an additional event within the captured video content, such as a customer on a bicycle, and using any of the processes described above. In some aspects, video processing system 120 may determine that the additional detected event, e.g., the customer on the bicycle, represents an anomaly within the captured video content because that additional detected event fails to be characterized by any of the event groups, e.g., the standing, leaning, or seated customers.

In certain implementations described above, video processing system 120 may detect events shown within digital video content captured by one or more video cameras during a prior time period, and based on a correlation between event parameter values that characterize certain detected and external events during a prior time period, generate a model that predicts an expected value of an external event parameters during a subsequent time period. For example, and as described above, video processing system 120 may receive digital video content captured by a video camera, e.g., video camera 102, disposed proximate to an entrance of a stadium, e.g., stadium entrance 103. Using any of the processes described above, video processing system 120 may detect numbers of customers queued at stadium entrance 103 at corresponding detection times within the digital video content during the prior time period, and based on an application of the model to the detected events, establish a total attendance for a scheduled event at the stadium during the subsequent time period.

In other aspects, video processing system 120 may also be configured to receive data indicative of occurrences of one or more additional events, and to correlate the occurrences of the detected events and the one or more additional events. By way of example, video processing system 120 may be in communication with one or more sensors across any of the communications networks described above, and may receive sensor data captured by these one or more sensors at predetermined intervals or in response to specified triggering events. For instance, the one or more sensors may include a temperature sensor, which transmits data identifying detected temperatures, e.g., additional events, to video processing system 120 at predetermined intervals. Using any of the processes described above, video processing system 120 may identify patterns within and/or correlations between the data identifying the time-varying numbers of queued customers at stadium entrance 103 (e.g., the detected events) and the time-varying temperatures (e.g., the additional events) within a prior time period, and based on the identified time-varying patterns and/or correlations, generate a model that predicts an expected total attendance at the stadium for an event scheduled during a subsequent time period that experiences a specific temperature or range of temperatures.

In additional aspects, video processing system 120 may receive portions of the additional event data from one or more external computing systems, such as computing systems maintained by various organizations, governmental entities, third-party or business entities, etc. For example, these external computing systems may include, but are not limited to, a traffic-light management system maintained by a transportation department of a local government and an emergency response system maintained by a local fire and rescue department, and video processing system 120 may receive data identifying an external event from one or more of these external computing systems, such as data identifying a time-varying activity of a crosswalk indicator proximate to stadium entrance 103 and/or time-varying occurrences of emergency calls in a region that includes the stadium, at predetermined intervals or in response to specified triggering events. Using any of the processes described above, video processing system 120 identify patterns within and/or correlations between the data identifying the time-varying numbers of queued customers at stadium entrance 103 (e.g., the detected events) and the additional events within a prior time period, and based on the identified time-varying patterns and/or correlations, generate a model that predicts an expected total attendance at the stadium for an event scheduled during a subsequent time period.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification, including video analytics module 122, model generation module 124, machine learning module 126, and event prediction module 128, can be implemented as one or more computer programs, i.e., one or more modules of computer program instructions encoded on one or more tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification and Appendix can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification and Appendix can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification and Appendix, or any combination of one or more such back-end, middleware, or front-end components. The components of the system can be interconnected by any form or medium of digital data communication, e.g., a communication network.

Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 6:
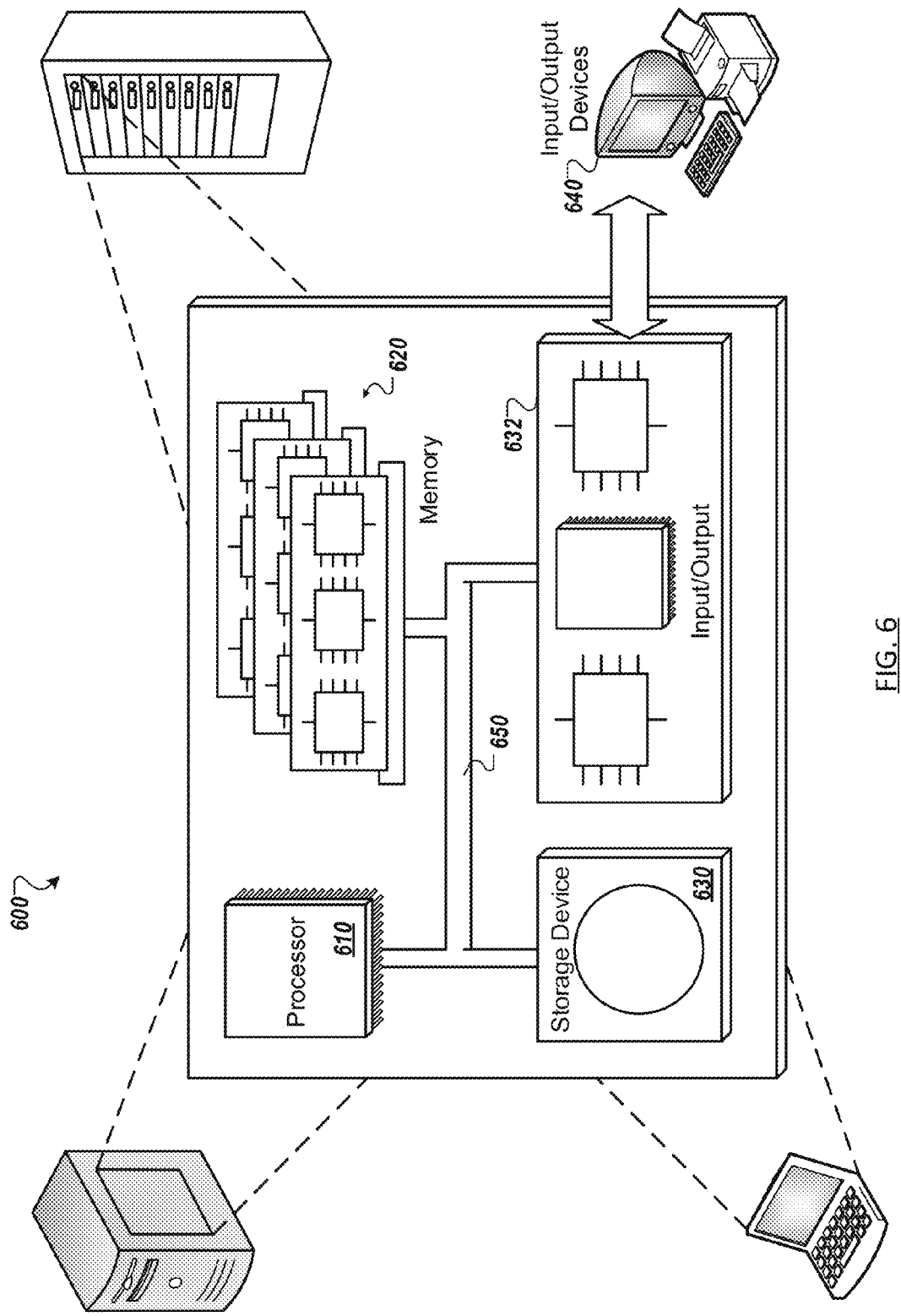
FIG. 6 is a diagram of an example computing system that may perform one or more of the disclosed computer-implemented processes.

An example of one such type of computer is shown in FIG. 6, which shows a schematic diagram of a generic computer system 600. The system 600 can be used for the operations described in association with any of the computer-implemented methods described previously, according to one implementation. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output module 632 includes hardware or hardware and software for interfacing system 600 with the input/output device 640 or other devices or interfaces.

Further, for situations in which the systems discussed here collect personal information about users, or may make use of personal information, the users may be provided with an opportunity to control whether programs or features collect personal information, e.g., information about a user's social network, social actions or activities, profession, a user's preferences, or a user's current location, or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained, e.g., to a city, zip code, or state level, so that a particular location of a user cannot be determined. Thus, the user may have control over how information is collected about him or her and used by a content server.

While this specification contains many specifics, these should not be construed as limitations, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations have been described. Other implementations are within the scope of the following claims. For example, the actions recited in the claims may be performed in a different order and still achieve desirable results.

What is claimed is:

1. A system, comprising:
  one or more computers; and
  one or more storage devices storing instructions that, when executed by the one or more computers, cause the one or more computers to perform operations comprising:
    detecting events shown within image frames of digital video content captured by one or more video cameras, the detected events being associated with corresponding event parameters and detection times within a first time period;
    obtaining first data that identifies at least one external event, the obtained data comprising observed values of an external event parameter that characterize the external event during the first time period, wherein the first data is not derived from the digital video content;
    establishing a predictive model that correlates the values of the external event parameters to values of the event parameters that characterize a portion of the detected events during the first time period, including establishing an existence of a time-varying pattern among the event parameters of the detected events during the first time period by applying a machine learning algorithm to data identifying the events and the values of the event parameters;
    detecting an additional event shown within the digital video content, the additional event being associated with a corresponding additional event parameter and a second detection time;
    in response to the detection of the additional event, applying the predictive model to a value of the additional event parameter;
    determining an expected value of the external event parameter at the second detection time, based on an outcome of applying the predictive model to the value of the additional event parameter;

based on the time-varying pattern, generating data identifying expected occurrences of one or more of the events during a second time period that includes the second detection time, the second time period occurring after the first time period; and transmitting, over a data communications network, data identifying the expected value of the external event parameter to a communications device having a display, the communications device configured to present a representation of the expected value of the external event parameter to a user through a corresponding interface of the display.

2. The system of claim 1, wherein:

the one or more computers further perform the operation of receiving a portion of the video content from the one or more video cameras; and the one or more video cameras comprise at least one of a pan-zoom-tilt video camera or a camera having a fixed field-of-view.

3. The system of claim 2, wherein detecting the additional event comprises:

receiving an additional video content from the one or more video cameras; and detecting the additional event within the additional video content captured by the one or more video cameras.

4. The system of claim 1, wherein the one or more computers further perform the operation of applying one or more video analytics to portions of the digital video content, the applied video analytics comprising at least one of an image acquisition process, an object detection process, an object classification process, an object recognition process, an event detection process, or an object tracking process.

5. The system of claim 4, wherein:

detecting the event comprises, based on an outcome of applying the video analytics to the portions of the digital video content, detecting at least one of the events and establishing the value of at least one of the event parameters; and detecting the additional event comprises, based on an outcome of applying the video analytics to the portions of the digital video content, detecting the additional event and establishing the value of the additional event parameter.

6. The system of claim 1, wherein the at least one external event is not shown within the digital video content captured by the one or more cameras.

7. The system of claim 1, wherein the establishing the predictive model comprises:

applying a second machine learning algorithm to data identifying the values of the external event parameters and the values of the event parameters that characterize the portion of the detected events during the first time period; and establishing a correlation between the values of the external event parameters and the event parameters, based on an outcome of the second machine learning algorithm.

8. The system of claim 1, wherein the one or more computers further perform the operations of:

obtaining second data specifying an observed value of the external event parameter at the second detection time;

determining an existence of a variance between the actual and expected values of the external event parameters; and modifying the predictive model in accordance with the determined variance.

9. The system of claim 1, wherein:

the external event comprises at least one of a number of customer inquiries or orders, a total number of individuals within a restricted area, or a total number of vehicles disposed within a restricted area;

the detected events comprise at least one of queued individuals, individuals entering a restricted area through a corresponding entrance, or vehicles entering the restricted area through a corresponding entrance; and the event parameters comprise at least one of a number of the queued individuals, a number of the individuals that enter the restricted area through the corresponding entrance, or a number of the vehicles that enter the restricted area through the corresponding entrance.

10. The system of claim 1, wherein, in response to the transmitted data, the communications device is further configured to allocate one or more resources in accordance with the expected value of the expected event parameter.

11. A system comprising:

one or more computers; and one or more storage devices storing instructions that, when executed by the one or more computers, cause the one or more computers to perform operations comprising:

detecting events shown within digital video content captured by one or more video cameras, the detected events being associated with corresponding event parameters and detection times within a first time period;

obtaining first data that identifies at least one external event, the obtained data comprising observed values of an external event parameter that characterize the external event during the first time period, wherein the first data is not derived from the digital video content;

establishing a predictive model that correlates the values of the external event parameters to values of the event parameters that characterize a portion of the detected events during the first time period;

detecting an additional event shown within the digital video content, the additional event being associated with a corresponding additional event parameter and a second detection time;

in response to the detection of the additional event, applying the predictive model to a value of the additional event parameter;

determining an expected value of the external event parameter at the second detection time, based on an outcome of applying the predictive model to the value of the additional event parameter;

transmitting data identifying the expected value of external event parameter to a communications device, the communications device configured to present a representation of the expected value of the external event parameter to a user through a corresponding interface;

establishing an existence of a time-varying pattern among the event parameters of the events detected during the first time period;

based on the time-varying pattern, generating data identifying expected occurrences of one or more of the events during a second time period that includes the second detection time, the second time period occurring after the first time period;

establishing a plurality of predictive models that correlate the values of the external event parameters to values of corresponding ones of the event parameters;
applying each of the predictive models to the value of the additional event parameter;
determining a plurality of expected values of the external event parameter at the second detection time, based on an outcome of corresponding ones of the predictive models;
obtaining second data specifying an observed value of the external event parameter at the second detection time;
determining variances between the observed value and corresponding ones of the expected values; and
selecting one or more of the event parameters as predictors of the observed value of the external event parameter based on the determined variances.

12. A system comprising:
one or more computers; and
one or more storage devices storing instructions that, when executed by the one or more computers, cause the one or more computers to perform operations comprising:
detecting events shown within digital video content captured by one or more video cameras, the detected events being associated with corresponding event parameters and detection times within a first time period;
obtaining first data that identifies at least one external event, the obtained data comprising observed values of an external event parameter that characterize the external event during the first time period, wherein the first data is not derived from the digital video content;
establishing a predictive model that correlates the values of the external event parameters to values of the event parameters that characterize a portion of the detected events during the first time period;
detecting an additional event shown within the digital video content, the additional event being associated with a corresponding additional event parameter and a second detection time;
in response to the detection of the additional event, applying the predictive model to a value of the additional event parameter;
determining an expected value of the external event parameter at the second detection time, based on an outcome of applying the predictive model to the value of the additional event parameter;
transmitting data identifying the expected value of external event parameter to a communications device, the communications device configured to present a representation of the expected value of the external event parameter to a user through a corresponding interface;
establishing an existence of a time-varying pattern among the event parameters of the events detected during the first time period;
based on the time-varying pattern, generating data identifying expected occurrences of one or more of the events during a second time period that includes the second detection time, the second time period occurring after the first time period;
determining that the additional event represents a deviation from the expected occurrences during the second time period; and
in response to the determination, transmitting data identifying the deviation to a communications device, the communications device being configured to present, to the user within a corresponding interface, a notification that includes at least a portion of the transmitted data.

13. A system comprising:
one or more computers; and
one or more storage devices storing instructions that, when executed by the one or more computers, cause the one or more computers to perform operations comprising:
detecting events shown within digital video content captured by one or more video cameras, the detected events being associated with corresponding event parameters and detection times within a first time period;
obtaining first data that identifies at least one external event, the obtained data comprising observed values of an external event parameter that characterize the external event during the first time period, wherein the first data is not derived from the digital video content;
establishing a predictive model that correlates the values of the external event parameters to values of the event parameters that characterize a portion of the detected events during the first time period;
detecting an additional event shown within the digital video content, the additional event being associated with a corresponding additional event parameter and a second detection time, wherein the detected additional event corresponds to at least one of a detected presence of an unexpected object within a portion of the digital video content, a detected removal of an expected object within a portion of the digital video content, or a detection of smoke or flames within a portion of the digital video content;
in response to the detection of the additional event, applying the predictive model to a value of the additional event parameter;
determining an expected value of the external event parameter at the second detection time, based on an outcome of applying the predictive model to the value of the additional event parameter;
transmitting data identifying the expected value of external event parameter to a communications device, the communications device configured to present a representation of the expected value of the external event parameter to a user through a corresponding interface;
establishing an existence of a time-varying pattern among the event parameters of the events detected during the first time period; and
based on the time-varying pattern, generating data identifying expected occurrences of one or more of the events during a second time period that includes the second detection time, the second time period occurring after the first time period.

14. A computer-implemented method, comprising:
detecting, by at least one processor, events shown within image frames of digital video content captured by one or more video cameras, the detected events being associated with corresponding event parameters and detection times within a first time period;
obtaining, by the at least one processor, first data that identifies at least one external event, the obtained data comprising observed values of an external event parameter that characterize the external event during the first time period, wherein the first data is not derived from the digital video content;

establishing, by the at least one processor, a predictive model that correlates the values of the external event parameters to values of the event parameters that characterize a portion of the detected events during the first time period, including establishing an existence of a time-varying pattern among the event parameters of the detected events during the first time period by applying a machine learning algorithm to data identifying the events and the values of the event parameters;

detecting, by the at least one processor, an additional event shown within the digital video content, the additional event being associated with a corresponding additional event parameter and a second detection time;

in response to the detection of the additional event, applying, by the at least one processor, the predictive model to a value of the additional event parameter;

determining, by the at least one processor, an expected value of the external event parameter at the second detection time, based on an outcome of applying the predictive model to the value of the additional event parameter;

based on the time-varying pattern, generating, by the at least one processor, data identifying expected occurrences of one or more of the events during a second time period that includes the second detection time, the second time period occurring after the first time period; and transmitting, by the at least one processor and over a data communications network, data identifying the expected value of external event parameter to a communications device having a display, the communications device configured to present a representation of the expected value of the external event parameter to a user through a corresponding interface of the display.

15. A system, comprising:
one or more computers; and
one or more storage devices storing instructions that, when executed by the one or more computers, cause the one or more computers to perform operations comprising:
   detecting events shown within image frames of digital video content captured by one or more video cameras, the detected events being associated with corresponding event parameters and detection times within a first time period;
   applying a predictive model to values of the event parameters that characterize a portion of the detected events during the first time period;
   based on an outcome of applying the predictive model to the values of the event parameters, generating data that identifies expected occurrences of one or more of the events during a second time period, the second time period occurring after the first time period, the generating including:
      based on the outcome of the predictive model, establishing an existence of a time-varying pattern among the values of the event parameters of the events detected during the first time period by:
         applying at least one of a machine learning algorithm or a data mining algorithm to data identifying the values of the event parameters and the detected events; and
         establishing the existence of the time-varying pattern based on an outcome of the at least one machine learning algorithm or data mining algorithm; and
      generating the expected occurrences of one or more of the events during the second time period in accordance with the time-varying pattern;
   detecting an additional event within the captured video content, the additional event being associated with a second detection time that occurs within the second time period;
   determining that the additional event represents a deviation from the expected occurrences during the second time period; and
   in response to the determination, transmitting, over a data communications network, data that identifies the deviation to a communications device having a display, the communications device being configured to present, to the user within a corresponding interface of the display, a notification that includes a representation of the deviation.

16. The system of claim 15, wherein the detected additional event corresponds to at least one of a detected presence of an unexpected object within a portion of the digital video content, a detected removal of an expected object within a portion of the digital video content, or a detection of smoke or flames within a portion of the digital video content.

* * * * *